2,885,293
COATINGS FOR FOOD CONTAINERS

Edward C. Haskell and Harry Burrell, Cincinnati, Ohio, assignors to Interchemical Corporation, New York, N.Y., a corporation of Ohio No Drawing. Application December 6, 1955
Serial No. 551,240

5 Claims. (Cl. 99—187)

Our invention relates to coating compositions for meat cans that prevent the meat from sticking to the can and methods of applying the compositions to can linings.

A polyethylene resin comprises the essential ingredient of the coating composition to which may be added other ingredients conventionally used in lacquers, enamels, varnishes, etc. The particular polyethylene resins that have given the best results are described as partially oxidized polyethylene having a molecular weight on the order of 2000 (Staudinger method), and an acid number on the order of 15, a saponification value on the order of 15, a specific gravity on the order of 93, a melting point on the order of 205° F. Other polyethylene resins can be used however, especially when used with a carrier wax.

The polyethylene resin can be applied alone as a hot melt to the surface to be protected. Preferably, however, when hot melt application is used, the polyethylene resin is applied along with a hydrocarbon wax as a carrier. The most suitable wax is microcrystalline wax although other paraffin or petrolatum waxes are operable. Also, the polyethylene resin can be applied as an ingredient in a conventional type of interior can lining lacquer, or as a simple dispersion in a volatile organic solvent.

Microcrystalline wax is a plastic, high melting point petroleum hydrocarbon wax made by removing most of oil from petrolatum by solvents or other means (Stewart's Scientific Dictionary, fourth edition, 1953). Such waxes melting within the range of 170 to 175° F. are preferred.

The new compositions applied to the linings of meat cans now enables the customers to remove the contents from the can in one solid piece instead of having to break up the pack in order to remove the meat. For example, when lean ground beef is processed in contact with tinplate coated merely with conventional coatings, the meat sticks to the coated metal surfaces; but when anti-stick coatings are applied to the cans in accordance with the present invention, the meat releases freely.

The anti-stick coatings can be applied to can linings by any conventional means as, for instance, by one of the following techniques:

(a) Incorporating the anti-stick compound in conventional can lining coating materials before applying to the tin.

(b) Applied as a separate top coat from solution or suspension.

(c) Applied by hot melt technique, e.g. with a Grammer waxer, using microcrystalline wax as a carrier.

The preferred technique for applying the anti-stick compound will depend upon the type of equipment that is used and the requirements as to processing time, baking schedule, etc.

Typical anti-stick compounds in accordance with the invention are as follows:

Example 1

| Name: | Percent by weight |
|---|---|
| Solid polyethylene resin, melting point 205–208° F., acid No. 14–17, specific gravity 0.93, saponification value 14–17 (e.g. A–C Polyethylene 629) | 10.0 |
| Microcrystalline wax, M.P. 170–175° F. (e.g. Tervan #2536) | 90.0 |
| | 100.0 |

This composition is applied by means of a Grammer waxer to a sheet of enamelled tinplate which is subsequently formed into a metal meat container in such a way that the coated surface is inside the container. The coated surface then released meats smoothly after the meats had been processed in the can. The polyethylene resin, when applied alone was equally effective as an anti-stick coating. However, the microcrystalline wax carrier, when applied alone, has substantially no anti-stick properties.

Example 2

| | Parts by weight |
|---|---|
| Polyethylene resin (as in Example 1) | 1 |
| Microcrystalline wax, M.P. 170–175° F | 9 |
| Hi-Flash Naphtha (hydrocarbon solvent having boiling range of 150–185° C. and kauri-butanol value of 87) | 90 |

The first two ingredients are melted together at about 250° F. and allowed to cool to room temperature. The mixture is then warmed with the Hi-Flash Naphtha to 160–190° F. When the solids have dissolved, the solution is allowed to cool, forming a fluid dispersion with not more than about 5 or 10% supernatant clear solvent. It is important that the temperature at which the polyethylene-wax blend is dissolved not be higher than about 190° F. because the dispersion will settle badly when cooled. While this settling does not affect meat release properties, it would necessitate agitation during use to insure uniformity. When applied to enamelled tinplate at the rate of as little as 0.1 to 0.4 milligram of solids per square inch of surface, the above composition is very effective in preventing meat from sticking to the enameled interior surfaces of meat cans. The composition can be applied by conventional means such as by spraying or roller coating. After application it may be air dried or given a flash bake. Also, the coating is effective on all inside can enamel surfaces that have been tested, as well as bare tinplate.

The proportions of polyethylene to wax are not critical since the wax and solvent serve only as carriers. The polyethylene may be conveniently varied from 19 to 50% or more of the polyethylene-wax combination, or the wax may be eliminated entirely and a polyethylene suspension in solvent used.

As stated hereinabove, the solid polyethylene resin can be incorporated into conventional interior can lining enamels to impart anti-stick properties to such enamels. Some care should be exercised in incorporating the polyethylene resin into the enamel so that it remains uniformly dispersed or dissolved in the enamel. Although enamels containing the resin in separated form have effective anti-stick properties when the resin is redispersed prior to application or during application, this technique is undesirable because of the inconvenience of doing it in a commercial can coating operation. As a result of numerous experiments it has been discovered that a very desirable technique for adding the solid polyethylene resin to sanitary can lining enamels is to first form a creamy dispersion of about 15 parts by weight of the resin in about 85 parts by weight of methyl isobutyl carbinol. This 15% solids dispersion is quite stable against settling while a 10% solids dispersion is not stable to settling. Furthermore, the 15% solids dispersion blended readily with all can enamels tested, to form clear solutions which show negligible separation. Enough of the 15% dispersion to give at least 0.05% polyethylene resin based on enamel solids should be used to obtain good anti-sticking properties. The upper limit is not particularly critical but generally no appreciable increase in anti-stick properties has been noted by adding more than 0.5% polyethylene resin based on enamel solids. Higher ratios may be more objectionable in some enamels than in others—not because of poor anti-stick properties—but for other reasons, for instance, a high ratio may produce a dull, waxy appearance in the cured enamel film.

The following example will illustrate the preferred technique for incorporating the solid polyethylene into a can lining enamel for meat cans.

*Example 3*

| | Parts by weight |
|---|---|
| Solid polyethylene resin (as in Example 1) | 15 |
| Methyl isobutyl carbinol | 85 |

The polyethylene resin is dissolved in the solvent by stirring and heating to 225° F. After straining through cotton, the solution is allowed to cool to room temperature with continuous stirring. A smooth, creamy, white dispersion is formed which is stable against settling. The stable dispersion blended readily with all can enamels to which it was added in amounts up to 0.1% polyethylene and higher, based on enamel solids. The enamels to which the polyethylene dispersion had been added were employed for coating cans using normal coatings procedures and baking schedules. Effective meat releasing properties were imparted to the coating in each instance.

Other polyethylene resins that can be used in conjunction with hydrocarbon waxes such as Tervan #2536 include: Epolene E (described by the supplier as polyethylene having a molecular weight on the order of 3000–4000, a softening point of 105° C. and an acid number of 9–10); Epolene N (described by the supplier as having a molecular weight of 3000–4000, a softening point of 105° C. and an acid number of less than 1); polyethylene DYGT described by the supplier as having a molecular weight of 7,000, specific viscosity of 0.15–0.18 at 70° C. and 0.4 gram/100 cc. solution in methyl cyclohexane); polyethylene DYNF-3 (described by supplier as having a molecular weight of 1800–1900 and a melt viscosity of $4 \times 10^5$ poises at 130° C.).

Other waxes that are operable include petrolatum, paraffin wax and ceresin wax.

We claim:

1. The method of preventing the adhesion of meat to the interior surfaces of a metal container after the meat has been cooked therein, said method including the steps of (1) coating the inside of the container, prior to cooking the meat therein, with polyethylene resin having a melting point on the order of 205° F., a specific gravity on the order of 0.93, a molecular weight on the order of 2000, an acid number on the order of 15 and a saponification value on the order of 15, and (2) cooking the meat in the polyethylene coated can.

2. The method of claim 1 in which the polyethylene resin is applied as a hot melt coating.

3. The method of claim 1 in which the polyethylene resin is applied as a suspension in hydrocarbon solvent.

4. The method of claim 1 in which the polyethylene resin is applied as a component in a conventional can lining enamel and amounts to at least 0.05% by weight of the solids of the enamel.

5. A composition consisting of about 85 parts by weight of methyl isobutyl carbinol having dispersed therein 15 parts by weight of polyethylene resin, said resin having a melting point on the order of 205° F., a specific gravity on the order of 0.93, a molecular weight on the order of 2000, an acid number on the order of 15, and a saponification value on the order 15.

References Cited in the file of this patent

UNITED STATES PATENTS

| 2,556,278 | Irvine | June 12, 1951 |
| 2,646,358 | Edgar | July 21, 1953 |
| 2,714,557 | Mahaffy | Aug. 2, 1955 |

OTHER REFERENCES

"Scientific American," June 1947, page 258.